(12) United States Patent
Duthaler

(10) Patent No.: US 7,636,191 B2
(45) Date of Patent: Dec. 22, 2009

(54) ELECTRO-OPTIC DISPLAY

(75) Inventor: Gregg M. Duthaler, Roslindale, MA (US)

(73) Assignee: E Ink Corporation, Cambridge, MA (US)

( * ) Notice: Subject to any disclaimer, the term of this patent is extended or adjusted under 35 U.S.C. 154(b) by 88 days.

(21) Appl. No.: 11/277,368

(22) Filed: Mar. 24, 2006

(65) Prior Publication Data

US 2006/0176267 A1    Aug. 10, 2006

Related U.S. Application Data

(62) Division of application No. 10/898,027, filed on Jul. 23, 2004, now abandoned.

(60) Provisional application No. 60/481,133, filed on Jul. 24, 2003, provisional application No. 60/481,320, filed on Sep. 2, 2003.

(51) Int. Cl.
G02B 26/00 (2006.01)
G02B 26/08 (2006.01)
G02F 1/29 (2006.01)

(52) U.S. Cl. .................. 359/296; 359/290; 359/298

(58) Field of Classification Search ........ 359/296, 359/290, 291, 292, 298, 295
See application file for complete search history.

(56) References Cited

U.S. PATENT DOCUMENTS

| 3,391,014 A | 7/1968 | Fauser |
| 3,668,106 A | 6/1972 | Ota |
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,870,517 A | 3/1975 | Ota et al. |
| 3,892,568 A | 7/1975 | Ota |
| 3,959,906 A | 6/1976 | Norris, Jr. et al. |
| 4,093,534 A | 6/1978 | Carter et al. |
| 4,160,257 A | 7/1979 | Carrish |
| 4,272,596 A | 6/1981 | Harbour et al. |
| 4,418,346 A | 11/1983 | Batchelder |
| 4,522,472 A | 6/1985 | Liebert et al. |
| 4,550,982 A | 11/1985 | Hirai |
| 4,602,263 A | 7/1986 | Borror et al. |

(Continued)

FOREIGN PATENT DOCUMENTS

EP    0 240 226 B1    11/1996

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Ricky L Mack
*Assistant Examiner*—Brandi N Thomas
(74) *Attorney, Agent, or Firm*—David J. Cole

(57) ABSTRACT

An electro-optic display comprises first and second substrates and a lamination adhesive layer and a layer of an electro-optic material disposed between the first and second substrates, the lamination adhesive layer having a thickness of from about 14 to about 25 μm.

8 Claims, 2 Drawing Sheets

Fig. 2

U.S. PATENT DOCUMENTS

| | | | |
|---|---|---|---|
| 4,655,897 | A | 4/1987 | DiSanto et al. |
| 4,703,573 | A | 11/1987 | Montgomery et al. |
| 4,742,345 | A | 5/1988 | DiSanto et al. |
| 4,746,917 | A | 5/1988 | DiSanto et al. |
| 5,250,938 | A | 10/1993 | DiSanto et al. |
| 5,276,438 | A | 1/1994 | DiSanto et al. |
| 5,288,433 | A | 2/1994 | Stevens |
| 5,293,528 | A | 3/1994 | DiSanto et al. |
| 5,378,404 | A | 1/1995 | Han et al. |
| 5,402,145 | A | 3/1995 | DiSanto et al. |
| 5,412,398 | A | 5/1995 | DiSanto et al. |
| 5,467,107 | A | 11/1995 | DiSanto et al. |
| 5,484,292 | A | 1/1996 | McTaggart |
| 5,485,176 | A | 1/1996 | Ohara et al. |
| 5,548,282 | A | 8/1996 | Escritt et al. |
| 5,745,094 | A | 4/1998 | Gordon, II et al. |
| 5,760,761 | A | 6/1998 | Sheridon |
| 5,777,782 | A | 7/1998 | Sheridon |
| 5,808,783 | A | 9/1998 | Crowley |
| 5,825,526 | A | 10/1998 | Bommarito et al. |
| 5,872,552 | A | 2/1999 | Gordon, II et al. |
| 5,930,026 | A | 7/1999 | Jacobson et al. |
| 5,945,555 | A * | 8/1999 | Yoshitake .................. 556/408 |
| 5,961,804 | A | 10/1999 | Jacobson et al. |
| 6,017,584 | A | 1/2000 | Albert et al. |
| 6,025,896 | A | 2/2000 | Hattori et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,097,531 | A | 8/2000 | Sheridon |
| 6,105,290 | A | 8/2000 | Coates et al. |
| 6,117,368 | A | 9/2000 | Hou |
| 6,118,426 | A | 9/2000 | Albert et al. |
| 6,120,588 | A | 9/2000 | Jacobson |
| 6,120,839 | A | 9/2000 | Comiskey et al. |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,249,271 | B1 | 6/2001 | Albert et al. |
| 6,252,564 | B1 | 6/2001 | Albert et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,300,932 | B1 | 10/2001 | Albert |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,323,989 | B1 | 11/2001 | Jacobson et al. |
| 6,327,072 | B1 | 12/2001 | Comiskey et al. |
| 6,330,054 | B1 | 12/2001 | Ikami |
| 6,337,761 | B1 | 1/2002 | Rogers et al. |
| 6,376,828 | B1 | 4/2002 | Comiskey |
| 6,377,387 | B1 | 4/2002 | Duthaler et al. |
| 6,392,785 | B1 | 5/2002 | Albert et al. |
| 6,392,786 | B1 | 5/2002 | Albert |
| 6,400,492 | B1 | 6/2002 | Morita et al. |
| 6,413,790 | B1 | 7/2002 | Duthaler et al. |
| 6,422,687 | B1 | 7/2002 | Jacobson |
| 6,445,374 | B2 | 9/2002 | Albert et al. |
| 6,445,489 | B1 | 9/2002 | Jacobson et al. |
| 6,459,418 | B1 | 10/2002 | Comiskey et al. |
| 6,473,072 | B1 | 10/2002 | Comiskey et al. |
| 6,480,182 | B2 | 11/2002 | Turner et al. |
| 6,498,114 | B1 | 12/2002 | Amundson et al. |
| 6,504,524 | B1 | 1/2003 | Gates et al. |
| 6,506,438 | B2 | 1/2003 | Duthaler et al. |
| 6,512,354 | B2 | 1/2003 | Jacobson et al. |
| 6,515,649 | B1 | 2/2003 | Albert et al. |
| 6,515,790 | B2 | 2/2003 | Miyamoto et al. |
| 6,518,949 | B2 | 2/2003 | Drzaic |
| 6,521,489 | B2 | 2/2003 | Duthaler et al. |
| 6,531,997 | B1 | 3/2003 | Gates et al. |
| 6,535,197 | B1 | 3/2003 | Comiskey et al. |
| 6,538,801 | B2 | 3/2003 | Jacobson et al. |
| 6,545,291 | B1 | 4/2003 | Amundson et al. |
| 6,580,545 | B2 | 6/2003 | Morrison et al. |
| 6,639,578 | B1 | 10/2003 | Comiskey et al. |
| 6,652,075 | B2 | 11/2003 | Jacobson |
| 6,657,772 | B2 | 12/2003 | Loxley |
| 6,660,352 | B2 * | 12/2003 | Hsu et al. .................. 428/40.1 |
| 6,664,944 | B1 | 12/2003 | Albert et al. |
| D485,294 | S | 1/2004 | Albert |
| 6,672,921 | B1 | 1/2004 | Liang et al. |
| 6,680,725 | B1 | 1/2004 | Jacobson |
| 6,683,333 | B2 | 1/2004 | Kazlas et al. |
| 6,693,620 | B1 | 2/2004 | Herb et al. |
| 6,704,133 | B2 | 3/2004 | Gates et al. |
| 6,710,540 | B1 | 3/2004 | Albert et al. |
| 6,721,083 | B2 | 4/2004 | Jacobson et al. |
| 6,724,519 | B1 | 4/2004 | Comiskey et al. |
| 6,727,881 | B1 | 4/2004 | Albert et al. |
| 6,738,050 | B2 | 5/2004 | Comiskey et al. |
| 6,750,473 | B2 | 6/2004 | Amundson et al. |
| 6,753,999 | B2 | 6/2004 | Zehner et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,822,782 | B2 | 11/2004 | Honeyman et al. |
| 6,825,068 | B2 | 11/2004 | Denis et al. |
| 6,825,829 | B1 | 11/2004 | Albert et al. |
| 6,825,970 | B2 | 11/2004 | Goenaga et al. |
| 6,831,769 | B2 * | 12/2004 | Holman et al. .............. 359/296 |
| 6,839,158 | B2 | 1/2005 | Albert et al. |
| 6,842,167 | B2 | 1/2005 | Albert et al. |
| 6,842,279 | B2 | 1/2005 | Amundson |
| 6,842,657 | B1 | 1/2005 | Drzaic et al. |
| 6,864,875 | B2 | 3/2005 | Drzaic et al. |
| 6,865,010 | B2 | 3/2005 | Duthaler et al. |
| 6,866,760 | B2 | 3/2005 | Paolini, Jr. et al. |
| 6,870,657 | B1 | 3/2005 | Fitzmaurice et al. |
| 6,870,661 | B2 | 3/2005 | Pullen et al. |
| 6,900,851 | B2 | 5/2005 | Morrison et al. |
| 6,922,276 | B2 | 7/2005 | Zhang et al. |
| 7,182,837 | B2 * | 2/2007 | Chen et al. .................. 162/134 |
| 7,339,715 | B2 * | 3/2008 | Webber et al. .............. 359/296 |
| 2001/0055000 | A1 | 12/2001 | Kanae et al. |
| 2002/0060321 | A1 | 5/2002 | Kazlas et al. |
| 2002/0063661 | A1 | 5/2002 | Comiskey et al. |
| 2002/0090980 | A1 | 7/2002 | Wilcox et al. |
| 2002/0113770 | A1 | 8/2002 | Jacobson et al. |
| 2002/0130832 | A1 | 9/2002 | Baucom et al. |
| 2002/0180687 | A1 | 12/2002 | Webber |
| 2003/0011560 | A1 | 1/2003 | Albert et al. |
| 2003/0020844 | A1 | 1/2003 | Albert et al. |
| 2003/0102858 | A1 | 6/2003 | Jacobson et al. |
| 2003/0132908 | A1 | 7/2003 | Herb et al. |
| 2003/0137521 | A1 | 7/2003 | Zehner et al. |
| 2003/0151702 | A1 | 8/2003 | Morrison et al. |
| 2003/0214695 | A1 | 11/2003 | Abramson et al. |
| 2003/0222315 | A1 | 12/2003 | Amundson et al. |
| 2004/0012839 | A1 | 1/2004 | Cao et al. |
| 2004/0014265 | A1 | 1/2004 | Kazlas et al. |
| 2004/0027327 | A1 | 2/2004 | LeCain et al. |
| 2004/0075634 | A1 | 4/2004 | Gates |

| | | | |
|---|---|---|---|
| 2004/0094422 A1 | 5/2004 | Pullen et al. | |
| 2004/0105036 A1 | 6/2004 | Danner et al. | |
| 2004/0112750 A1 | 6/2004 | Jacobson et al. | |
| 2004/0119681 A1 | 6/2004 | Albert et al. | |
| 2004/0136048 A1 | 7/2004 | Arango et al. | |
| 2004/0155857 A1 | 8/2004 | Duthaler et al. | |
| 2004/0180476 A1 | 9/2004 | Kazlas et al. | |
| 2004/0190114 A1 | 9/2004 | Jacobson et al. | |
| 2004/0196215 A1 | 10/2004 | Duthaler et al. | |
| 2004/0226820 A1 | 11/2004 | Webber et al. | |
| 2004/0239614 A1 | 12/2004 | Amundson et al. | |
| 2004/0252360 A1 | 12/2004 | Webber et al. | |
| 2004/0257635 A1 | 12/2004 | Paolini, Jr. et al. | |
| 2004/0263947 A1 | 12/2004 | Drzaic et al. | |
| 2005/0000813 A1 | 1/2005 | Pullen et al. | |
| 2005/0001812 A1 | 1/2005 | Amundson et al. | |
| 2005/0007653 A1 | 1/2005 | Honeyman et al. | |
| 2005/0012980 A1 | 1/2005 | Wilcox et al. | |
| 2005/0024353 A1 | 2/2005 | Amundson et al. | |
| 2005/0035941 A1 | 2/2005 | Albert et al. | |
| 2005/0089656 A1* | 4/2005 | Shiina | 428/34.2 |
| 2005/0099672 A1 | 5/2005 | Jacobson et al. | |

FOREIGN PATENT DOCUMENTS

| | | |
|---|---|---|
| EP | 1 145 072 B1 | 5/2003 |
| JP | 62-269124 A | 11/1987 |
| JP | 64-086116 | 3/1989 |
| JP | 01-267525 A | 10/1989 |
| JP | 02-284125 A | 11/1990 |
| JP | 05-143009 A | 6/1993 |
| JP | 10-149118 A | 6/1998 |
| WO | WO 82/02961 | 9/1982 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/92359 | 12/2001 |
| WO | WO 03/107315 | 12/2003 |

OTHER PUBLICATIONS

Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Bouchard, A. et al., "High-Resolution Microencapsulated Electrophoretic Display on Silicon", SID 04 Digest, 651 (2004).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic ink for all-printed reflective electronic displays", Nature, 394, 253 (1998).
Comiskey, B., et al., "Electrophoretic Ink: A Printable Display Material", SID 97 Digest (1997), p. 75.
Croucher, M.D., et al., "Electrophoretic Display: Materials as Related to Performance", Photog. Sci. Eng., 25, 80 (1981).
Dalisa, A.L., "Electrophoretic Display Technology", IEEE Trans. Electron Dev., ED-24, 827 (1977).
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Gutcho, M.H., Microcapsules and MIcroencapsulation Techniques, Noyes Data Corp., Park Ridge NJ, (1976).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances", SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal $TiO_2$ Films", Nature, vol. 353, Oct. 24, 1991, 773-740.
Ota, I., et al., "Developments in Electrophoretic Displays", Proceedings of the SID, 18, 243 (1977).
Pitt, M.G., et al., "Power Consumption of Microencapsulated Electrophoretic Displays for Smart Handheld Applications", SID 02 Digest, 1378 (2002).
Shiwa, S., et al., "Electrophoretic Display Method Using Ionographic Technology," SID 88 Digest (1988), p. 61.
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

* cited by examiner

ELECTRO-OPTIC DISPLAY

REFERENCE TO RELATED APPLICATIONS

This application is a divisional of application Ser. No. 10/898,027, filed Jul. 23, 2004 (Publication No. 2005/0122563, now abandoned), which claims benefit of Provisional Applications Ser. No. 60/481,133, filed Jul. 24, 2003 and Ser. No. 60/481,320, filed Sep. 2, 2003.

This application is also related to application Ser. No. 10/064,389, filed Jul. 2, 2002 (Publication No. 2003/0025855, now U.S. Pat. No. 6,831,769), which itself claims priority of Provisional Application Ser. No. 60/304,117, filed Jul. 9, 2001.

The entire contents of these copending applications, and of all other U.S. patents and published and copending applications mentioned below, are herein incorporated by reference.

BACKGROUND OF INVENTION

This invention relates to improvements in electro-optic displays. More specifically, in one aspect this invention relates to electro-optic media and displays in which the thickness of a lamination adhesive layer is controlled to avoid certain problems otherwise experienced in such displays. In another aspect, this invention relates to the prevention of void growth in electro-optic displays.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudocolor in the sense of a change in reflectance of electromagnetic wavelengths outside the visible range.

The terms "bistable" and "bistability" are used herein in their conventional meaning in the imaging art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (Mar. 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; and 6,727,881; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011868; 2003/0020844; 2003/0025855; 2003/0034949; 2003/0038755; 2003/0053189; 2003/0102858; 2003/0132908; 2003/0137521; 2003/0137717; 2003/0151702; 2003/0189749; 2003/0214695; 2003/0214697; 2003/0222315; 2004/0008398; 2004/

0012839; 2004/0014265; 2004/0027327; 2004/0075634; 2004/0094422; 2004/0105036; and 2004/0112750; and International Applications Publication Nos. WO 99/67678; WO 00/05704; WO 00/38000; WO 00/38001; WO00/36560; WO 00/67110; WO 00/67327; WO 01/07961; WO 01/08241; WO 03/092077; WO 03/107315; and WO 2004/049045.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

Known encapsulated electrophoretic displays can be divided into two main types, referred to hereinafter for convenience as "single particle" and "dual particle" respectively. A single particle medium has only a single type of electrophoretic particle suspended in a colored medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) The optical characteristic is typically color visible to the human eye, but may, alternatively or in addition, be any one or more of reflectivity, retroreflectivity, luminescence, fluorescence, phosphorescence, or color in the broader sense of meaning a difference in absorption or reflectance at non-visible wavelengths. When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the colored suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles are black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility, will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid to sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Certain of the aforementioned E Ink and MIT patents and applications describe electrophoretic media which have more than two types of electrophoretic particles within a single capsule. For present purposes, such multi-particle media are regarded as a sub-class of dual particle media.

Both single and dual particle electrophoretic displays may be capable of intermediate gray states having optical characteristics intermediate the two extreme optical states already described.

A related type of electrophoretic display is a so-called "microcell electrophoretic display". In a microcell electrophoretic display, the charged particles and the suspending fluid are not encapsulated within capsules but instead are retained within a plurality of cavities formed within a carrier medium, typically a polymeric film. See, for example, International Application Publication No. WO 02/01281, and U.S. Patent Application Publication No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display useable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. It will readily be apparent to those skilled in the manufacture of electro-optic displays that other types of electro-optic media, for example microcell electrophoretic media and rotating bichromal member media, can be laminated in an exactly analogous manner. The obvious lamination technique for mass production of displays by this process is roll lamination using a lamination adhesive. In a modified form of such a lamination process, as described for example in the aforementioned 2004/0027327, the substrate having the capsule/binder layer thereon is first laminated to a layer of adhesive carried on a release sheet to form a structure called a "front plane laminate" (or "FPL"), and thereafter the release sheet is peeled from the front plane laminate and the remaining layers of the front plane laminate are laminated to a backplane using the adhesive layer exposed by removal of the release sheet, thereby forming the final display. A related lamination process using two separate laminations is described in copending application Ser. No. 10/605,024, filed Sep. 2, 2003 (Publication No. 2004/0155857).

In practice, these lamination processes impose stringent requirements upon both the mechanical and electrical properties of the lamination adhesive. In the final electro-optic display, the lamination adhesive is located between the electrodes which apply the electric field needed to change the electrical state of the electro-optic medium, so that the electrical properties of the adhesive become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved. Hence, it has hitherto been assumed that it is desirable to make the adhesive layer as thin as possible, consistent with satisfactory adhesion, in order to minimize the "wasted" voltage drop across the adhesive layer.

There are numerous other electrical and mechanical constraints which a lamination adhesive used in an electro-optic display must satisfy, as discussed in detail in the aforementioned 2003/0025855. One particular problem not there discussed, but to which the present invention relates, is the "void problem". To ensure a high quality display, it is essential that the final display be free from voids, since such voids produce visible defects in images written on the display. To ensure that the final display is free from voids, it is essential that both the lamination to form the front plane laminate (when effected) and the final lamination to the backplane be carried out without the formation of voids. It is also necessary that the final display be able to withstand substantial temperature changes (such as may occur, for example, when a portable computer or personal digital assistant is removed from an air-conditioned car to outdoor sun on a hot day) without inducing or aggravating the formation of voids, since it has been found that some displays, which initially appear essentially free from voids, can develop objectionable voids when exposed to such temperature changes. This phenomenon may be termed "void re-growth".

It has now been found that, especially in encapsulated electrophoretic displays, such void re-growth is a function of the thickness of the lamination adhesive, and that to avoid the formation of objectionable voids the thickness of the lamination adhesive should not be reduced below a critical value. This value is believed to be somewhat dependent upon the specific material, typically a polymer, used as the lamination adhesive, the exact type of electro-optic medium used and the lamination conditions employed, but is typically around 14 µm.

Thus, in one aspect this invention provides an electro-optic display having a controlled thickness of lamination adhesive.

Also, from the foregoing discussion, it will be seen that many electro-optic displays are of a "hybrid" type and consist of an asymmetric stack of materials with highly dissimilar properties. For example, the aforementioned front plane laminate ("FPL") comprises, in order, a polymeric film substrate, a light-transmissive electrode, a layer of a electro-optic medium, a layer of lamination adhesive and a release sheet; to produce the final display, this front plane laminate is laminated in the manner already described to a backplane comprising a plurality of pixel electrodes on a glass or other substrate. The release sheet of the front plane laminate is removed prior to its lamination to the backplane, so that the final structure comprises, in order, the polymeric film substrate, light-transmissive electrode, layer of a electro-optic medium, layer of lamination adhesive, pixel electrodes and glass or other substrate. Such a structure is in principle structurally unstable, as differences in thermal and moisture expansion coefficients of the polymeric film and glass substrates induce very large stress and strains in the display. Under particular stresses, especially those realized at elevated temperatures, the instability manifests itself in the formation of voids (i.e. delamination, hereafter called void growth of the layers derived from the front plane laminate from the glass substrate).

This invention provides approaches to eliminating, or at least reducing, void growth in electro-optic displays.

SUMMARY OF INVENTION

Accordingly, in one aspect, this invention provides an electro-optic display comprising first and second substrates and a lamination adhesive layer and a layer of an electro-optic material disposed between the first and second substrates, the lamination adhesive layer having a thickness of from about 14 to about 25 µm.

This electro-optic display may hereinafter for convenience be referred to as the "controlled lamination adhesive thickness" or "CLAT" display of the present invention.

In such a CLAT display, the lamination adhesive layer desirably has a thickness of from about 14 to about 20 µm. In one form of the CLAT display, the electro-optic layer comprises a particle-based electrophoretic material comprising a suspending fluid and a plurality of electrically charged particles suspended in the suspending fluid and capable of moving therethrough on application of an electric field to the electrophoretic material. Such an electrophoretic material may be an encapsulated electrophoretic material in which the suspending fluid and the electrically charged particles and encapsulated within a plurality of capsules, each of the capsules having a capsule wall. (In this case, and in the other cases where encapsulated electrophoretic material is mentioned below, the encapsulated electrophoretic material may be of the polymer-dispersed type with the suspending fluid and the electrically charged particles in the form of a plurality of droplets dispersed in a continuous phase which in effect acts as capsule walls for the droplets, although no discrete capsule wall for each droplet is present.)

The lamination adhesives used in CLAT displays may be similar to those used in the aforementioned 2003/0025855. Thus, the lamination adhesive may have one or more of the following characteristics:

(a) a volume resistivity, measured at 10° C., which does not change by a factor of more than about 3 after being at 25° C. and 45 per cent relative humidity for 1000 hours;

(b) a peel strength from an electrode material in contact with the lamination adhesive of at least about 2 lb/inch (about 35 Newtons m$^{-1}$);

(c) a volume resistivity which changes by a factor of less than about 10 within a range of 10 to 90 per cent relative humidity and over a temperature range of 10 to 50° C.;

(d) a shear modulus at 120° C. of not more than about 1 megaPascal;

(e) in the case of displays using an electrophoretic material, a dielectric constant and volume resistivity such that the product of the dielectric constant and the volume resistivity of the lamination adhesive are not greater than the product of the dielectric constant and the volume resistivity of the electrophoretic material within a range of 10 to 90 per cent relative humidity and over a temperature range of 10 to 50° C.; and (f) at least one of an ultra-violet stabilizer and a light absorbing material incorporated in the lamination adhesive.

This invention also provides a front plane laminate for forming an electro-optic display, the front plane laminate being an article of manufacture comprising, in order, a light-transmissive electrically-conductive layer, a layer of an electro-optic material, a lamination adhesive having a thickness of from about 14 to about 25 µm, and a release sheet.

In such a front plane laminate, the lamination adhesive layer desirably has a thickness of from about 14 to about 20 µm. In one form of the front plane lamination, the electro-optic layer may comprise a particle-based electrophoretic material comprising a suspending fluid and a plurality of electrically charged particles suspended in the suspending fluid and capable of moving therethrough on application of an electric field to the electrophoretic material. Such an electrophoretic material may be an encapsulated electrophoretic material in which the suspending fluid and the electrically charged particles and encapsulated within a plurality of capsules, each of the capsules having a capsule wall.

This invention also provides an electro-optic display comprising: a backplane comprising at least one electrode; a layer of electro-optic material; and a lamination adhesive disposed between the backplane and the layer of electro-optic material, the lamination adhesive comprising an adhesion promoter effective to increase the adhesion between the lamination adhesive and the backplane.

In such an electro-optic display, the adhesion promoter may comprise any one or more of 1-propanamine, 3-aminopropyltrimethoxysilane, 3-aminopropyl-dimethylethoxysilane, and hexamethyldisilizane.

This invention also provides a front plane laminate for forming an electro-optic display, the front plane laminate being an article of manufacture comprising, in order, a front substrate, a light-transmissive electrically-conductive layer, a layer of an electro-optic material, and a lamination adhesive layer, wherein the front substrate has a thickness not greater than about 20 mil (about 0.5 mm).

In such a front plane laminate, the front substrate desirably has a thickness not greater than about 10 mil (about 0.25 mm). The front plane laminate may further comprise a release sheet covering the lamination adhesive. Such a release sheet desirably has a thickness not greater than about 15 mil (about 0.37 mm), and preferably not greater than about 10 mil (about 0.25 mm). The electro-optic material may be an encapsulated electrophoretic material comprising a plurality of capsules, each capsule comprising a capsule wall, a suspending fluid encapsulated within the capsule wall and a plurality of electrically charged particles suspended in the suspending fluid and capable of moving therethrough on application of an electric field to the electrophoretic material.

This invention also provides a front plane laminate for forming an electro-optic display, the front plane laminate being an article of manufacture comprising, in order, a light-transmissive electrically-conductive layer, a layer of an electro-optic material, a lamination adhesive layer, and a release sheet wherein the release sheet has a thickness not greater than about 15 mil (about 0.37 mm).

In such a front plane laminate the release sheet desirably has a thickness not greater than about 10 mil (about 0.25 mm). The electro-optic material may be an encapsulated electrophoretic material comprising a plurality of capsules, each capsule comprising a capsule wall, a suspending fluid encapsulated within the capsule wall and a plurality of electrically charged particles suspended in the suspending fluid and capable of moving therethrough on application of an electric field to the electrophoretic material.

This invention also provides a front plane laminate for forming an electro-optic display, the front plane laminate being an article of manufacture comprising, in order, a light-transmissive electrically-conductive layer, a layer of an encapsulated electrophoretic material comprising a plurality of capsules, each capsule comprising a capsule wall, a suspending fluid encapsulated within the capsule wall and a plurality of electrically charged particles suspended in the suspending fluid and capable of moving therethrough on application of an electric field to the electrophoretic material, and a lamination adhesive layer, wherein the lamination adhesive layer has a peak to valley roughness not greater than about 15 µm.

In such a front plane laminate, the lamination adhesive layer desirably has a peak to valley roughness not greater than about 10 µm, preferably not greater than about 5 µm.

Finally, this invention provides a front plane laminate for forming an electro-optic display, the front plane laminate being an article of manufacture comprising, in order, a light-transmissive electrically-conductive layer, a layer of an encapsulated electrophoretic material comprising a plurality of capsules, each capsule comprising a capsule wall, a suspending fluid encapsulated within the capsule wall and a plurality of electrically charged particles suspended in the suspending fluid and capable of moving therethrough on application of an electric field to the electrophoretic material, and a lamination adhesive layer, wherein the lamination adhesive layer has local surface angles not greater than about 15° from the horizontal.

In such a front plane laminate, the lamination adhesive layer desirably has local surface angles not greater than about 10° from the horizontal, preferably not greater than about 5° from the horizontal.

DETAILED DESCRIPTION

Figure 1A:
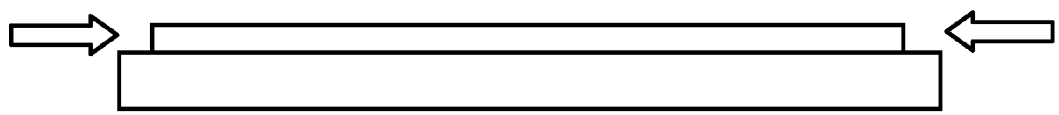
FIG. 1A is a schematic side elevation of a electro-optic display as it is formed at room temperature.

In the controlled lamination adhesive thickness display of the present invention, and in the corresponding front plane laminate, the thickness of the lamination adhesive is controlled to eliminate, or at least substantially reduce, void re-growth in the final display. Empirically, it has been found that typically a minimum lamination adhesive thickness of about 14 µm is needed to reduce void re-growth to an acceptable level, and that increasing the lamination adhesive thickness further, up to about 18 µm, may provide additional control of void re-growth. Increasing the lamination adhesive thickness above about 18 µm does not appear to increase resistance to void re-growth but, as already noted, it is desirable to avoid an unnecessarily thick lamination adhesive layer in order to avoid a large voltage drop across this layer, so in practice it is advantageous to limit the lamination adhesive thickness to not more than about 25, or preferably 20, µm.

Apart from controlling the thickness of the lamination adhesive in accordance with the present invention, the lamination adhesive may be as described in the aforementioned 2003/0025855; thus, the lamination adhesive may have any one of more of the following properties:

(a) a volume resistivity, measured at 10° C., which does not change by a factor of more than about 3 after being at 25° C. and 45 per cent relative humidity for 1000 hours;

(b) a peel strength from an electrode material in contact with the lamination adhesive of at least about 2 lb/inch (about 35 Newtons m$^{-1}$);

(c) a volume resistivity which changes by a factor of less than about 10 within a range of 10 to 90 per cent relative humidity and over a temperature range of 10 to 50° C.;

(d) a shear modulus at 120° C. of not more than about 1 megaPascal;

(e) in the case of CLAT displays using an electrophoretic material, a product of the dielectric constant and the volume resistivity of the lamination adhesive not greater than the product of the dielectric constant and the volume resistivity of the electrophoretic material within a range of 10 to 90 per cent relative humidity and over a temperature range of 10 to 50° C.;

(f) an ultra-violet stabilizer incorporated into the lamination adhesive; and (g) a light absorbing material incorporated into the lamination adhesive.

The CLAT display and front plane laminate of the invention, are especially, but not exclusively, intended to use with encapsulated electrophoretic media; as discussed above, such media comprise a plurality of capsules, each capsule comprising a capsule wall, a suspending fluid encapsulated within the capsule wall and a plurality of electrically charged particles suspended in the suspending fluid and capable of moving therethrough on application of an electric field to the electrophoretic material. Other types of electro-optic media, for example microcell electrophoretic, rotating bichromal member media, and electrochromic media, may also be used.

The following Example 1 is now given, though by way of illustration only, to show details of preferred materials and techniques for use in CLAT display of the present invention.

EXAMPLE 1

An internal phase was prepared comprising polymer-coated titania white particles and polymer-coated carbon black particles in a hydrocarbon suspending fluid. This internal phase was encapsulated in gelatin/acacia microcapsules substantially as described in Paragraphs [0069] to [0074] of the aforementioned 2002/0180687. The resultant microcapsules were separated by size and capsules having an average particle size of about 35 µm were used in the following experiments. The microcapsules were mixed into a slurry with a polyurethane binder and coated by a roll-to-roll process at a dry coating weight of 18 g m$^{-2}$ on to the surface of a 7 mil (177 µm) poly(ethylene terephthalate) film carrying an indium tin oxide (ITO) layer on one surface, the microcapsules being deposited on the ITO-covered surface, substantially as described in Paragraphs [0075] and [0076] of the aforementioned 2002/0180687. The capsule-bearing film was then formed into a front plane laminate by laminating it to a layer of a polyurethane lamination adhesive carried on a release sheet, this lamination being effected at 65 psig (0.51 mPa) at a speed of 6 inches/min (2.5 mm/sec) using a Western Magnum twin roll Laminator with both rolls held at 120° C. The thickness of the lamination adhesive on the release sheet was varied to vary the thickness of the corresponding layer in the final display. To provide experimental single-pixel displays suitable for use in these experiments, pieces of the resultant front plane laminate had their release sheets removed and were then laminated at 75° C. to the ITO-covered surfaces of ITO-on-glass substrates.

To test void re-growth, the displays thus produced were subjected to a temperature of 90° C. and a relative humidity of 17 per cent for 17 hours, and the percentage of voids in the display was measured before exposure to the elevated temperature, after 5 hours exposure and after the 17 hours exposure. Eight sections of each display was measured and the results reported below are the average of the eight sections. The panels were switched to their white optical state, and a digital image of each section was taken. All pixels of the digital image were analyzed to determine whether they were above or below a threshold (and thus white or dark) and the total area of white and dark pixels was calculated, and hence the percentage void area, the black pixels being assumed to represent void area.

The thickness of the lamination adhesive layer initially formed on the release sheet was adjusted to provide nominal adhesive thicknesses of 12, 14, 16 and 16 µm in the final displays. The actual thicknesses measured are as shown in Table 1 below:

TABLE 1

| Target Thickness (µm) | Measured thickness (µm) | Standard Deviation (µm) |
|---|---|---|
| 12 | 11.7 | 0.8 |
| 14 | 13.6 | 0.9 |
| 16 | 15.6 | 1.3 |
| 18 | 18.1 | 1.5 |

The results obtained are shown in Table 2 below; in the third and fourth columns, the figures given are the increase in voids at 5 hours and 17 hours respectively, compared with the initial figures for the same samples, while the last column gives the total percentage of voids at the end of the experiment:

TABLE 2

| Target Thickness (µm) | Initial % void | 5 Hour Δ % void | Final Δ % void | Total % void |
|---|---|---|---|---|
| 12 | 0.06 | 0.39 | 0.68 | 0.74 |
| 14 | 0.02 | 0.08 | 0.13 | 0.14 |
| 16 | 0.03 | 0.01 | 0.09 | 0.12 |
| 18 | 0.09 | −0.04 | 0.06 | 0.15 |

From Table 2, it will be seen that the display having the 12 µm lamination adhesive layer suffered substantial void re-growth during the experiment, but the extent of void re-growth was much less in the other displays.

The aspects of the present invention other than the CLAT display and front plane laminate will now be discussed. As already indicated, these other aspects of the invention relate mainly to controlling the thicknesses and mechanical properties of the various layers of an electro-optic display or front plane laminate.

Figure 1B:
FIG. 1B is a schematic side elevation similar to that of FIG. 1A but taken at an elevated temperature and showing the buckling of the front substrate of the electro-optic display.

Before discussing these aspects of the present invention in detail, it is deemed advisable to first consider the forces which lead to void growth and related defects in electro-optic displays. Void growth in electro-optic displays arises from a combination of factors. As already noted, the structural mechanics of this type of display suggest that the display will tend to be unstable at elevated temperatures. When, as is typically the case, an electro-optic display is constructed with a front substrate comprising a polymeric film (through which an observer views the display) and a glass or similar rigid backplane, differences in coefficient of thermal expansion (CTE) and coefficient of relative humidity expansion (CHE) between the materials used in the construction create stresses and strains large enough to cause curling or warping of the display. More specifically, the CTE of the polymeric film will typically be substantially greater than that of the rigid backplane. Thus, even though as originally formed at ambient temperature, the front substrate lies parallel to the backplane, as illustrated in FIG. 1A of the accompanying drawings (the electro-optic medium is omitted from FIGS. 1A and 1B for ease of illustration), under extreme high temperature (and/or high humidity) conditions, the polymeric film substrate enters into a state of compression because its bond to the rigid glass substrate prevents the polymeric from expanding as much as it desires. Under the action of this compressive stress, the polymeric film buckles.

It is difficult to conceive of ways to prevent the emergence of compressive stresses in this high temperature/relative humidity environmental limit, given the structural elements in this system. One cannot simply build the display panel at elevated temperatures so that only minimal temperature gradients are experienced during environmental stressing, as such a panel will dramatically curl when lowered to room temperature, as the polymeric film shrinks substantially more with temperature than the backplane. Moreover, if this approach were used, the display might experience catastrophic failure such as edge seal delamination when it is stressed in cold temperature extremes, such delamination being caused by tension generated in the front substrate during cooling.

One can look to structural theory to gain insight into what parameters to modify in order to reduce the tendency of the film to delaminate. However, one finds that the critical buckling force $P_{crit}$ per unit width may be predicted to a first order using the following relationship (the one-dimensional case is considered for simplicity):

$$P_{crit} \sim \left(\frac{kEt^3}{3}\right)^{1/2}$$

where k is the tensile stiffness of the adhesive connecting the electro-optic material layer to the backplane, E is the Young's modulus of the polymeric front substrate, and t is the thickness of this front substrate. From this simple relationship, it can be seen that it is desirable to increase the tensile stiffness of the adhesive, the stiffness of the bond between the adhesive and the backplane and the stiffness of the bond between the adhesive and the electro-optic layer.

Increasing the stiffness of the adhesive can be troublesome, however, as a stiffer adhesive tends to be much more difficult to laminate using thermal lamination processes, such as those described in the aforementioned 2004/0027327. It is instead desirable to influence the strength of the bonds between the lamination adhesive layer, the backplane and the electro-optic layer. To strengthen the bond between the lamination adhesive and the backplane, one can use adhesion promoters such as 1-propanamine, 3-(trimethoxysilyl) (more systematically named 3-amino-propyltrimethoxysilane), 3-aminopropyldimethylethoxysilane, hexamethyldisilizane or other such materials. Other materials that form covalent bonds to the glass surface (or coatings on the glass surface) and have suitable chemistry for bonding to the lamination adhesive may also be used. To strengthen the bond with the electro-optic layer, it is primarily desirable to ensure that the adhesive bonds well to the materials which forms the surface of this layer adjacent the lamination adhesive; in the case of encapsulated electrophoretic media, this material is typically the polymeric binder used to form the capsules into a coherent layer, as described in the aforementioned E Ink and MIT patents and applications.

Alternatively or in addition, it may be desirable to use state-of-the-art cleaning methods to prepare the surface of the backplane. Ultra-violet, ozone, plasma, solvent cleaning, and other such methods known to those skilled in the art and may be used for this purpose. Corona discharge processing of the adhesive is another surface preparation method that may prove useful.

At first glance, the above equation also suggests that it is desirable to increase E and t of the polymeric front substrate. However, further analysis of the stress/strain state of a hybrid display show that increasing E and t increases the loading on the polymeric substrate in absolute terms, so increases in these parameters tend to be counter-productive.

The above equation is, however, based upon a simplified model of the display, and practical experience indicates that there are additional factors which affect the void growth process in encapsulated electrophoretic and other electro-optic displays. Specifically, the experience of the present inventors and their co-workers has made it clear that, when a display is formed by laminating a front plane laminate to a backplane in the manner already described, the surface roughness of the front plane laminate should be kept small and the lamination adhesive thickness relatively large to ensure that a high quality lamination is achieved during manufacture, and that voids do not grow during storage in extreme environmental conditions.

The front plane laminate described in the aforementioned 2004/0027327 is preferably prepared (when an encapsulated electrophoretic medium is used) by first coating and drying a film of capsules and polymeric binder on a transparent conductor (for example, indium tin oxide or conductive polymer) carried on the polymeric film substrate (for which poly(ethylene terephthalate) or PEN are preferred). The capsules themselves vary in size, but are preferably 30 μm to 50 μm (85% confidence), more preferably 30 μm to 50 μm (99% confidence), and even more preferably 35 μm to 45 μm (99% confidence).

Figure 2:
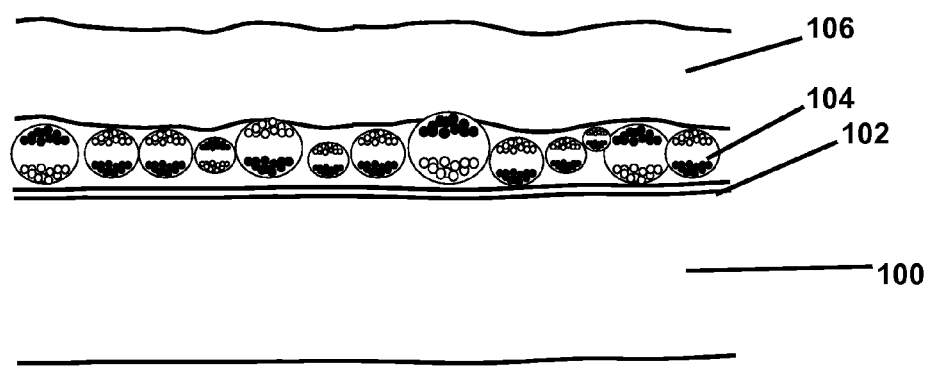
FIG. 2 is a schematic side elevation of a front plane laminate of the present invention showing the uneven surfaces of the electro-optic material and lamination adhesive layer.
Figure 3:
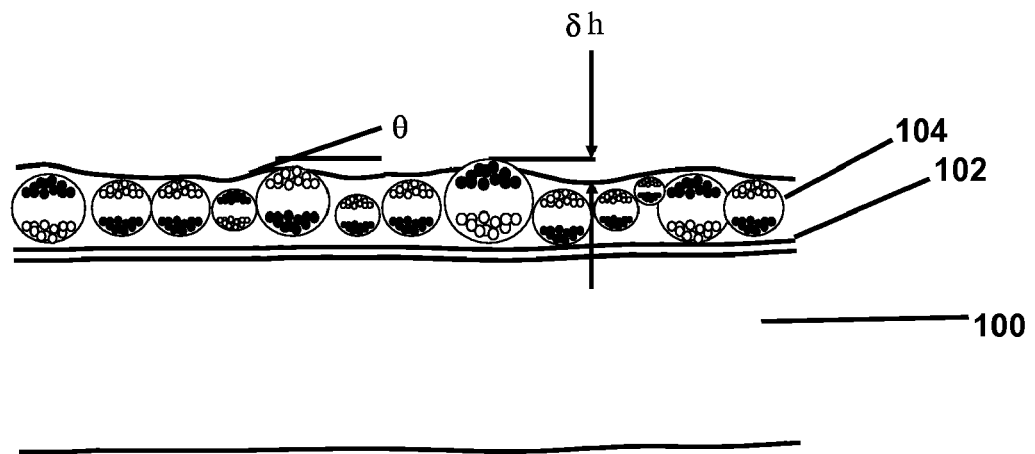
FIG. 3 is a schematic side elevation similar to that of FIG. 2 but prior to the application of the lamination adhesive and shows the manner in which the peak-to-valley roughness and the local surface angles of the electro-optic layer are measured.

The effects of this variation in size of capsules will now be considered using FIGS. 2 and 3 of the accompanying drawings. FIG. 2 illustrates schematically a front plane laminate comprising a transparent front substrate 100 through which the observer views the display. This front substrate 100 carries a light-transmissive conductive layer 102, on which is formed an electrophoretic layer 104, illustrated as comprising a plurality of capsules dispersed in a binder. On the opposed side of the electrophoretic layer 104 from the conductive layer 102 is provided a release sheet 106. In practice, a layer of lamination adhesive is normally provided between the electrophoretic layer 104 and the release sheet 106, but this lamination adhesive is omitted from FIGS. 2 and 3 for ease of illustration. FIG. 3 of the accompanying drawings is a schematic illustration similar to FIG. 2 but showing the front plane laminate with the release sheet 106 removed, and showing the peak-to-valley roughness and local surface angle (as discussed below) of the electrophoretic layer 104.

It will be apparent that the aforementioned variation in size of capsules results in an uneven surface of the electrophoretic (electro-optic) layer 104 facing the release sheet 106 (i.e., the upper surface of the layer 104 as illustrated in FIGS. 2 and 3). In preferred embodiments, the front substrate is thick enough to enhance the mechanical ruggedness of the display, for example by conferring impact resistance. Preferably, the front substrate is thinner than 20 mil (approx. 0.5 mm). Even more preferably the front substrate is thinner than 10 mil (approx. 0.25 mm).

Consideration of the structure of such a front plane laminate shows that there is an optimum thickness for the release sheet, which is preferably also formed from poly(ethylene terephthalate) or PEN, and which may, for reasons explained in the aforementioned 2004/0027327 bear a conductive layer on its surface facing the electro-optic medium. If the release sheet is too thin, it will follow the contours of the electro-optic layer. If these contours are too closely followed, one finds that, after lamination of the front plane laminate to the backplane, many air voids exist between the backplane and the layer of lamination adhesive. However, if the release sheet is too thick, the release sheet becomes more costly and it becomes very difficult to maintain the integrity of the front plane laminate if it is rolled up during storage. For these reasons, it is generally preferred that the release sheet be thinner than 15 mil (approx. 0.37 mm), desirably thinner than 10 mil (approx. 0.25 mm). At present, it is typically preferred to use a polymeric substrate 7.5 mil (188 μm) thick and a release sheet 5 mil (approx. 127 μm) thick.

Since the release sheet is thinner than the front substrate, the topography of the uneven capsule film is mainly transferred to the release sheet 106, as shown in FIG. 2. Note that the uneven topography (known in the imaging industry as "orange peel") is most apparent on the exposed surface of the release sheet, but is evident to some degree on the exposed surface of the front substrate. (As will readily be apparent to those skilled in the art, FIGS. 2 and 3 show the various layers of the display inverted with respect to FIG. 1, so that in FIGS.

2 and 3 the exposed surface of the front substrate, which forms the viewing surface of the display, is at the bottom of the Figure.)

There are two requirements for ensuring that voids are not present in the display cell after lamination of the front plane laminate to the backplane, namely: (1) there must be sufficient thickness of adhesive and/or binder to ensure that the interstitial spaces between capsules are filled with adhesive and/or binder and some amount of additional adhesive covers the largest diameter capsules in the layer, and (2) the surface roughness of the front plane laminate meets certain specifications described below.

Consideration of FIG. 2, and especially of the largest capsule shown therein, suggests that there may be situations in which the largest capsules do not have appreciable amounts of adhesive and/or binder between them and the release sheet. This creates a potential defect in the display, where adhesion is locally reduced and a void is likely to appear under high temperature stress. Accordingly, it is desirable to select the adhesive and/or binder material properties and thickness, and to apply the adhesive and/or binder in such a way that all interstitial spaces between capsules and all areas above capsules are coated with adhesive and/or binder. Preferably, the thinnest region of the adhesive and/or binder should be less than 30 µm, more preferably less than 20 µm, and desirably less than 10 µm. Of course, it is desirable to keep adhesive and/or binder thickness as low as possible to reduce voltage drop across the adhesive and maximize the voltage drop across the electro-optic medium.

Once sufficient adhesive and/or binder has been applied to fill in interstitial sites and cover the largest capsules, it is important that the surface of the adhesive be sufficiently flat. As shown in FIG. 3, which is a schematic side elevation similar to that of FIG. 2 but after removal of the release sheet from the FPL, this flatness requirement places limits on the surface roughness (measured as peak-to-valley roughness, δh in FIG. 3) of the front plane laminate after removal of the release sheet. There are many ways to specify surface roughness for such a laminate. It is desirable that the peak-to-valley roughness be less than 15 µm, preferably less than 10 µm, and most desirably less than 5 µm. In addition, it is also desirable that the local surface angles (indicated as θ in FIG. 3) on the front plane laminate be less than 15° from the horizontal, preferably less than 10° from the horizontal, and most desirably less than 5° from the horizontal. This restriction on surface angles helps to ensure that lamination process speeds can be high enough for mass production.

Figure 4A:
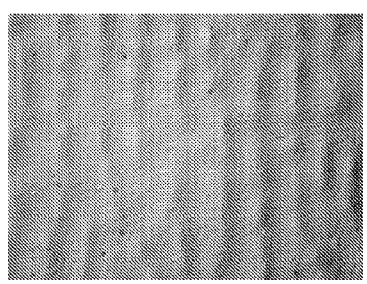
FIG. 4A is a photomicrograph of a front plane laminate having a peak-to-valley roughness greater than 5 µm.
Figure 4B:
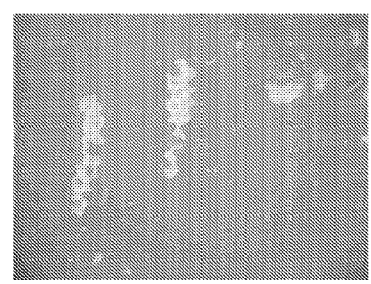
FIG. 4B is a photomicrograph showing the voids which result from the lamination of the front plane laminate of FIG. 4A to a glass backplane.

FIGS. 4A and 4B of the accompanying drawings show respectively a photomicrograph of a front plane laminate with long wavelength peak-to-valley roughness greater than 5 µm, and the voids that result after thermal lamination of this relatively rough front plane laminate to a glass backplane. These voids would be likely to produce unacceptable artifacts in a commercial electro-optic display.

It will be appreciated that the optimum adhesive thickness for adhesive filling of interstitial sites and covering the largest capsules may vary with capsule size distribution. As an example, assume the capsule size distribution ranges from 20 µm to 60 µm (i.e., assume 99% of capsules fall within this size range). After drying the capsules on the front substrate, their thickness typically drops by about 50% due to coating and drying dynamics, so the largest dried capsules will be some 30 µm in thickness and the smallest capsules will be some 10 µm in thickness. Thus, the peak-to-valley roughness of the resulting capsule layer will be slightly larger than 20 µm (30 µm for the largest capsule minus 10 µm for the smallest capsule, plus the distance from the top of the smallest capsule to the bottom of an interstitial site next to a small capsule). In such a situation, it is desirable to apply more than 20 µm, and typically more than 30 µm, of lamination adhesive to ensure that lamination voids do not exist after manufacture or after environmental stressing. If the capsule size distribution were much tighter, say 35 µm to 45 µm (with 99% confidence), then the peak-to-valley roughness would be only slightly larger then 5 µm and a thinner adhesive film could safely be applied.

The following Example 2 is now given to show how the peak-to-valley roughness of a front plane laminate affects the formation of voids after lamination of the front plane laminate to an experimental backplane.

Front plane laminates and experimental displays were prepared in substantially the same manner as in Example 1, except that either no lamination adhesive was applied to the capsule/binder layer or (nominally) 12, 18, 25, 35 or 45 µm layers of a custom polyurethane-based lamination adhesive was applied. The root mean square surface roughness and the peak-to-valley roughness of the exposed surfaces of the front plane laminate, after removal of the release sheet, were measured using a KLA-Tencor Surface Profiler with a 2000 µm (2 mm) scan length. The laminates were then laminated to the backplane and the formation of voids immediately after lamination was observed; these voids are referred to as "t0 voids" in Table 3 below. The experimental displays thus formed were stored at 90° C. for 15 hours and the voids again observed visually (called "t15" in Table 3). The results are shown in Table 3 below, in which "Rptv" denotes peak-to-valley roughness.

TABLE 3

| Adhesive micron | R rms (um) | | R ptv | | t0 | t15 |
|---|---|---|---|---|---|---|
| | AVG | STDEV | AVG | STDEV | | |
| 0 | 2.4 | 0.4 | 13.6 | 2.5 | n/a | n/a |
| 12 | 1.2 | 0.3 | 8.6 | 2.2 | Many t0 voids! | t0 voids coalescing, still evident but some "healing" |
| 18 | 0.2 | 0.2 | 0.9 | 1.7 | Many t0 voids-fewer than 12 um level | t0 voids coalescing, still evident but some "healing" |
| 25 | 0.3 | 0.3 | 1.9 | 2.0 | Few/no t0 voids | Few signs of void growth |
| 35 | 0.0 | 0.0 | 0.2 | 0.1 | No t0 voids | No signs of void growth |
| 45 | 0.0 | 0.0 | 0.2 | 0.1 | No t0 voids | No signs of void growth |

From the data in Table 3, it will be seen that increasing the thickness of the lamination adhesive reduced the number of voids. More specifically, the data suggest that, to positively affect the void growth problem, the adhesive thickness should be somewhat larger than the maximum observed peak-to-valley height change of the electrophoretic layer.

From the foregoing, it will be seen that the buckling instability of layers in hybrid displays is a complex phenomena that could jeopardize the success of such products in the marketplace, especially as specifications on electronic displays become more and more demanding as competitive technologies such as liquid crystal displays become more refined. The present invention provides pathways for mitigating this problem which are well suited to large scale manufacture.

Numerous changes and modifications can be made in the preferred embodiments of the present invention already described without departing from the spirit and skill of the invention. Accordingly, the foregoing description is to be construed in an illustrative and not in a limitative sense.

The invention claimed is:

1. A front plane laminate for forming an electro-optic display, the front plane laminate being an article of manufacture comprising, in order, a light-transmissive electrically-conductive layer, a layer of an encapsulated electrophoretic material comprising a plurality of capsules, each capsule comprising a capsule wall, a suspending fluid encapsulated within the capsule wall and a plurality of electrically charged particles suspended in the suspending fluid and capable of moving therethrough on application of an electric field to the electrophoretic material, and a lamination adhesive layer, wherein the lamination adhesive layer has local surface angles not greater than about 15° from the horizontal.

2. A front plane laminate according to claim 1 wherein the lamination adhesive layer has local surface angles not greater than about 10° from the horizontal.

3. A front plane laminate according to claim 2 wherein the lamination adhesive layer has local surface angles not greater than about 5° from the horizontal.

4. A front plane laminate according to claim 1 wherein the front substrate has a thickness not greater than about 20 mil.

5. A front plane laminate according to claim 4 wherein the front substrate has a thickness not greater than about 10 mil.

6. A front plane laminate according to claim 1 further comprising a release sheet covering the lamination adhesive.

7. A front plane laminate according to claim 6 wherein the release sheet has a thickness not greater than about 15 mil.

8. A front plane laminate according to claim 7 wherein the release sheet has a thickness not greater than about 10 mil.

* * * * *